United States Patent [19]

Chapin, Jr.

[11] Patent Number: 4,760,618

[45] Date of Patent: Aug. 2, 1988

[54] APPARATUS FOR CLEANING THE INTERIOR OF A MOUSE

[76] Inventor: Stephen R. Chapin, Jr., 3809 Chesterwood Dr., Silver Spring, Md. 20906

[21] Appl. No.: 38,182

[22] Filed: Apr. 14, 1987

Related U.S. Application Data

[63] Continuation of Ser. No. 768,383, Aug. 22, 1985, Pat. No. 4,673,440.

[51] Int. Cl.$^4$ ............................................. B08B 9/02
[52] U.S. Cl. ..................................... 15/104.93; 15/1; 15/104 R; 15/210 R
[58] Field of Search ............... 15/97 R, 104 A, 1, 4, 15/104 R, 210 R, 104.93; 134/8

[56] References Cited

U.S. PATENT DOCUMENTS 271,358 1/1883 Pike ......................................... 134/8

FOREIGN PATENT DOCUMENTS 332759 11/1958 Switzerland ...................... 15/104 A

*Primary Examiner*—Edward L. Roberts

[57] ABSTRACT

Methods of an apparatus for cleaning an electromechanical transducer such as a "mouse" used for moving cursors on a computer display terminal comprise a scrubbing ball having a "hook" VELCRO surface and a pad having a "loop" VELCRO surface. The VELCRO covered ball is lightly coated with solvent, inserted into the recess of the "mouse" and rolled over the "loop" VELCRO surface. This rolling action scrubs the interior of the "mouse" and transfers dust, debris and suspended oil from the recess of the mouse to the pad.

3 Claims, 2 Drawing Sheets

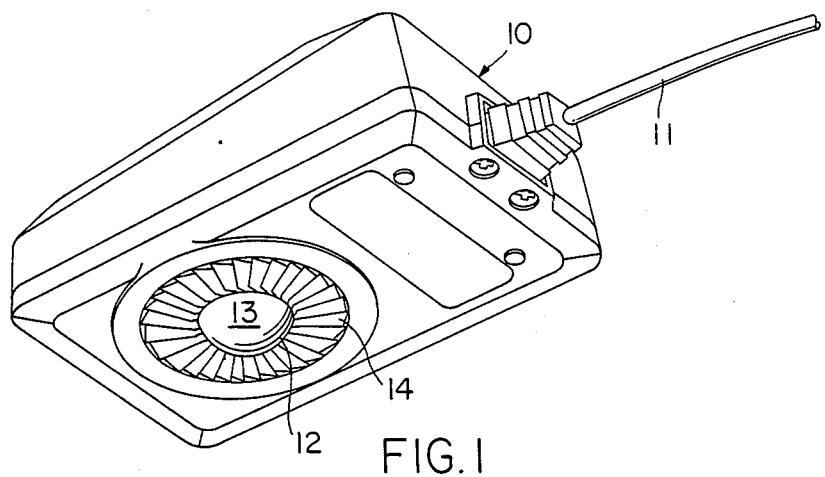
FIG.1
FIG.2
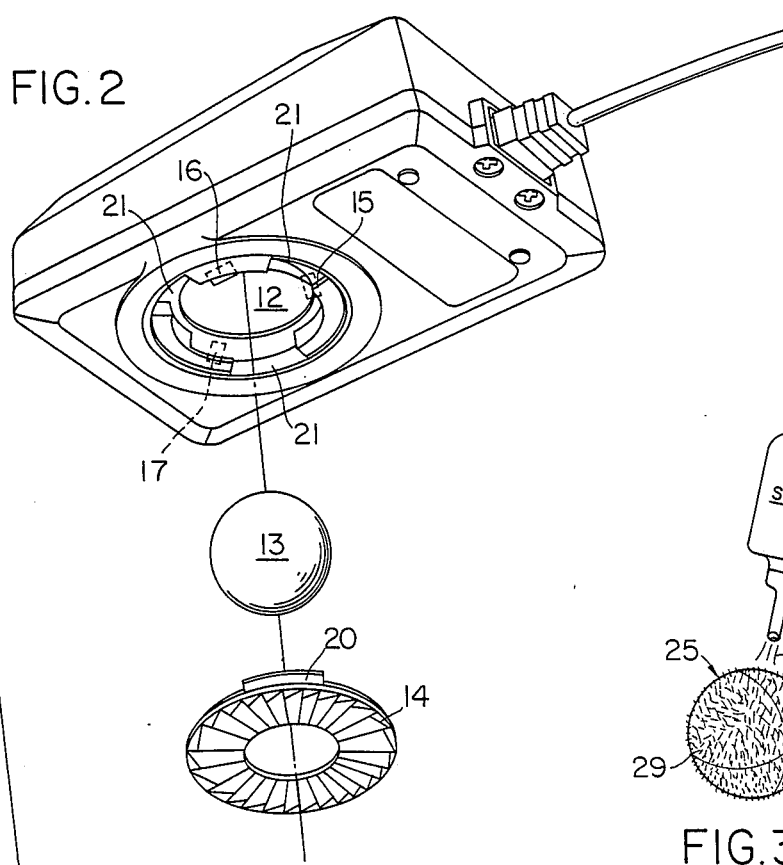
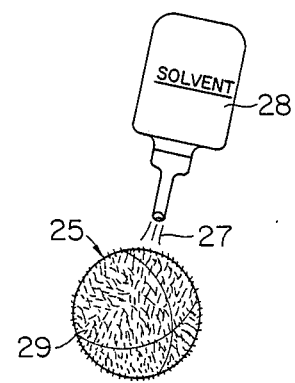
FIG.3

1

APPARATUS FOR CLEANING THE INTERIOR OF A MOUSE

This is a continuation of application Ser. No. 768,383 filed Aug. 22, 1985 now U.S. Pat. No. 4,673,440.

BACKGROUND OF THE INVENTION

1. Field of the Invention

The instant invention relates to methods of and apparatus for cleaning electro-mechanical devices. More particularly, the instant invention relates to methods of and apparatus for cleaning the spherical recess of an electro-mechanical device used with computers and known as a "mouse".

2. Technical Considerations and Prior Art

In order to conveniently move a cursor on the screen of a display, there has recently come into use an electro-mechanical device known as a "mouse". Typically, a "mouse" comprises a housing having therein a spherical recess. Contained within the spherical recess is a ball and an array of contacts. Upon holding the "mouse" and manually rolling it on the ball over a flat surface, coordinate signals are generated by the contacts engaged by the ball and displayed on the computer screen. In order for the "mouse" to function properly, it is very important that the contacts be kept clean.

The prior art method of cleaning the "mouse" was to remove the resilient ball and clean the contacts with a cotton swap moistened with a solvent such as alcohol or tapehead cleaner. Dust which has accumulated within the recess is removed by blowing gently into the case. The resilient ball itself is then cleaned by wiping it with a clean, dry, lint-free cloth. In practice, this approach has proved rather unsatisfactory in that it is very difficult to remove dust and lint from the recess by blowing into the recess. Blowing into the recess simply moves the dust into the mouse and allows some of the dust to deposit inside of the mouse. Moreover, the cotton swab does not adequately clean the rollers and the interior surface of the recess. Applicant has found that it frequently takes a great deal of time, on the order of 15-20 minutes to properly clean a "mouse".

In view of these difficulties with the prior art, there is need for a rapid and more effective way to clean a "mouse".

SUMMARY OF THE INVENTION

In view of the foregoing considerations, it is an object of the instant invention to provide new and improved methods of and apparatus for cleaning the recesses of devices such as electro-mechanical transducers.

Upon further study of the specification and appended claims, further objects and advantages of this invention will become apparent to those skilled in the art.

In view of the aforementioned object, and other objects, the instant invention contemplates a method of cleaning recesses in electro-mechanical devices by inserting a sphere having a mechanically adhesive surface thereon into the recess and rotating the sphere in the recess to adhere dust and debris in the recess on the adhesive surface.

The instant invention further contemplates coating the sphere with a solvent to dissolve oil prior to inserting the sphere wherein oil on the contacts and on the inner surface of the recess is thereafter transferred to the more absorbent surface of the sphere.

The instant invention further contemplates utilizing Velcro material as the adhesive surface.

In addition, the instant invention contemplates apparatus for performing the afore-described method, wherein the apparatus includes a sphere having a mechanically adhesive surface and a pad having a surface which complements the surface of the sphere wherein material picked up by the sphere is transferred to the pad. The pad also serves to some the sphere to rotate against the contacts when the sphere is manually guided along the pad's surface.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein:

FIG. 1 is a perspective view of the "mouse" which is cleaned by utilizing the apparatus of the instant invention in accordance with the method of the instant invention;

FIG. 2 is an exploded view of the "mouse" which is to be cleaned in accordance with the instant invention showing removal of a rubber sphere therefrom;

FIG. 3 is a perspective view of a cleaning sphere configured in accordance with the principals of the instant invention having a mechanically adhesive surface which utilizes a material such as VELCRO;

Figured 4 is a perspective view of the bottom of the "mouse" showing the cleaning sphere of FIG. 3 inserted in the recess of the "mouse" after the cleaning sphere has been coated with solvent and after the rolling sphere has been removed therefrom.

DESCRIPTION OF THE PREFERRED EMBODIMENT

Figure 4:
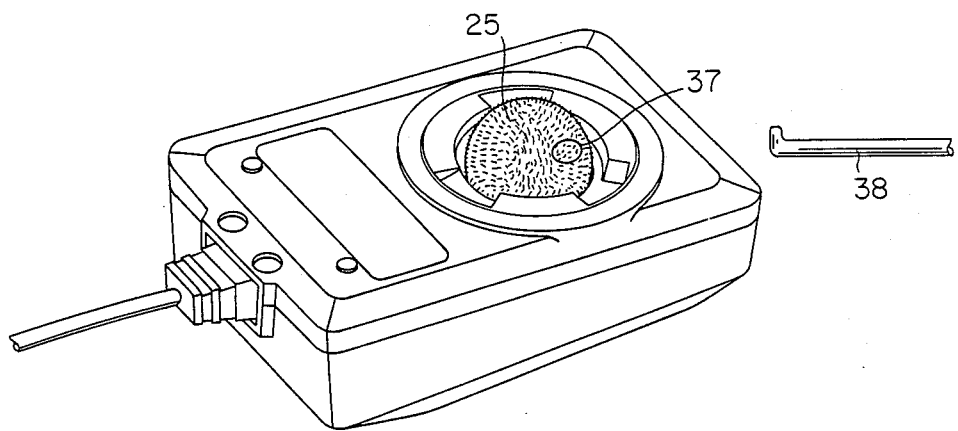

Referring now to FIG. 1, there is shown a "mouse" designated generally by the numeral 10. The "mouse" 10 is connected by a cable 11 to a computer display terminal (not shown). The "mouse" 10 includes a spherical concavity or recess 12 which contains a metal or rubber ball or sphere 13 which is held in the recess by an annular retainer 14. In operation, the "mouse" 10 is held in ones hand and rolled on a flat surface such as a desk or table top in order to position and move a cursor on the associated display terminal. As is seen in FIG. 2, the recess 12 includes three rollers 15, 16 and 17 which are engaged and driven by the ball. The rollers 15 are attached to electro-mechanical transducers which provide outputs indicative of the direction in which the "mouse" is moving so as to move the cursor on the computer display terminal. Roller 17 is used to force contact between rollers 18 and 16 and the sphere.

As the ball 13 rolls over the table or desk top it picks up dust, debris and oil, such as oil excreted by the computer operator. Over a period of time, the oil, debris and dust accumulates on the interior surface of the recess 12 and on the rollers 15, 16 and 17. Eventually, this buildup migrates to the electrical components and denigrates the performance of the "mouse". Accordingly, the "mouse" must be periodically cleaned.

Referring now more specifically to FIGS. 2-5, in order to accomplish the principles of the instant invention, the retaining ring 14 is removed by rotating the retaining ring 14 to align lugs 20 thereon with openings 21 in the housing 10. Upon removing the retaining ring 14, the rubber ball 13 can drop out of the recess 12. A scrubbing ball, designated generally by the numeral 25 and shown in FIG. 3 is then placed in the recess 12. Prior to placing the scrubbing ball 25 in the recess 12, the scrubbing ball is coated with a solvent such as alcohol or tapehead cleaner 27. Preferably, the surface of the scrubbing ball 25 is covered with a mechanically adhesive surface such as a hooked VELCRO material 29. While VELCRO material is a preferred embodiment, it is within the scope of this invention to utilize other materials which have an adhesive quality and can perform a scrubbing action. However, this inventor has found that VELCRO material is especially suitable Referring now to FIG. 4, after the scrubbing ball 25 has been coated with solvent 27 from the container 28, the scrubbing ball is placed in the recess 12 as is shown in FIG. 4. The ball retaining ring 14 may be remounted, but not necessarily so. The "mouse" 10 is then turned upside down to rest on a pad 31 which has a surface 32 that complements the surface 29 on the ball 25. For example, the surface 32 of the pad 31 will have VELCRO "loops" if the mechanically adhesive surface 29 on the ball 25 is comprised of VELCRO "hooks". The complementary pad 31 is mounted on a resilient cushion 33 in order to enhance contact and engagement between the hooks on the scrubbing ball 25 and the loops of the surface 32 on the complementary pad 31. The cushion 33 is in turn mounted on a rigid base 34.

In order to effect cleaning of the recess 12 and contacts 15, 16 and 17, the "mouse" 10 is gripped in one hand and moved more or less randomly in the direction of arrows 35 for perhaps 30 seconds to a minute. As the "mouse" 10 is moved over the pad 31, while pressed thereagainst, the ball 25 rolls on the pad and slides with respect to both the interior surface 12 of the mouse and the rollers 15, 16 and 17. Accordingly, the ball 25 scrubs both the interior surface 12 and the rollers 15, 16 and 17. Dust and debris is picked up by the hooks on the surface 29 of the cleaning ball 25, while oils dissolved in the solvent 27 are absorbed by the surface of the hooks. As the hooks come into engagement with the loops comprising the surface 32 of the pad 31, the hooks are scrubbed by the loops. There are many more loops than hooks and the loops are oriented in a relatively random fashion. Consequently, the loops remove debris and dust from the hooks with considerable efficiency. In addition, since the loops have more surface area than the hooks, the loops tend to remove the dissolved oil from the hooks, which oil is suspended in the solvent 27 on the surface 29 of the ball 25. Also, the loops serve to force the sphere 25 to rotate against the contacts 15, 16 and 20 17, as the sphere 25 is manually guided along the surface.

Figure 5:
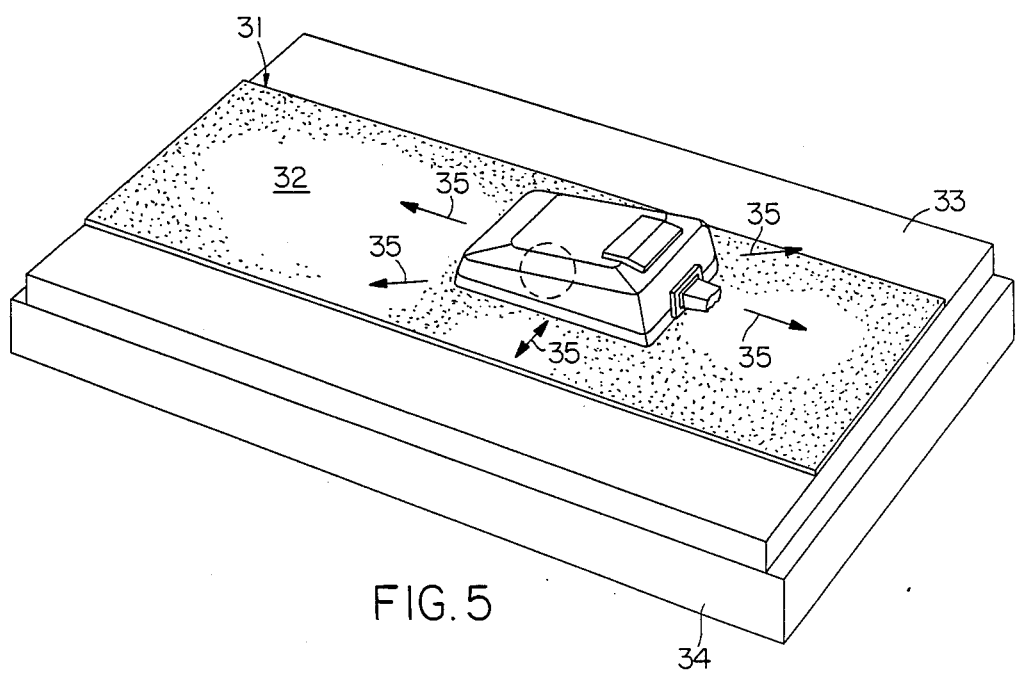
FIG. 5 is a perspective view showing the "mouse" arranged as in FIG. 4 being rolled on a cleaning pad surface complementing the surface of the cleaning sphere of FIGS. 3 and 4, wherein the cleaning pad and surface is a surface formed of looped VELCRO so as to remove dust, debris and oils from the contacts within the recess and from the surface of the recess itself.

After the interior of the "mouse" 10 has been scrubbed, the "mouse" is turned over to the FIG. 4 position and the scrubbing ball 25 removed. In order to facilitate removal of the scrubbing ball 25, the scrubbing ball may have a hole 37 therein, or therethrough, in which a removal pin 38 is inserted in order to pull the ball from the recess 12. The rollers 15, 16 and 17 and the inner surface of the recess 12 are then checked to see if the dust, debris and oil have been removed therefrom. If not, the process of FIG. 5 is repeated.

Upon completing cleaning of the recess 12, the resilient ball 13 is lightly wiped with solvent using a lint-free fabric, allowed to dry and insert it into the recess 12. The retaining ring 14 is then replaced and the "mouse" 10 is ready for use.

After repeated use, the pad 31 will accumulate dust, debris and oil and should be washed with soap and water. After the pad dries, it is ready to use again.

When not in use, the ball 25 is simply stuck to the pad 31 for storage.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Apparatus for cleaning an interior cavity of an electro-mechanical device wherein the interior cavity has electro-magnetic transducers therein and a spherical surface, the apparatus comprising:
    a ball covered with VELCRO material arranged as an array of hooks, and
    a pad of VELCRO material arranged with an array of loops complementing the hooks of the VELCRO material on the shpere whereby when the sphere is placed in the recess and rolled on the pad, dirt and debris is picked up by the hooks on the sphere and transferred to the loops on the pad.

2. The device of claim 1 further including a rigid base for mounting the VELCRO pad and a resilient cushion disposed between the VELCRO pad and the rigid base.

3. The apparatus of claim 2 further including a solvent accompanying the VELCRO covered sphere and VELCRO covered pad wherein the solvent is applied to the sphere prior to inserting this sphere in the recess of the electro-mechanical device.

* * * * *